Oct. 16, 1928.
S. P. MERMER
1,687,985
GLASS GRINDING MACHINE
Filed Feb. 26, 1927
3 Sheets-Sheet 1
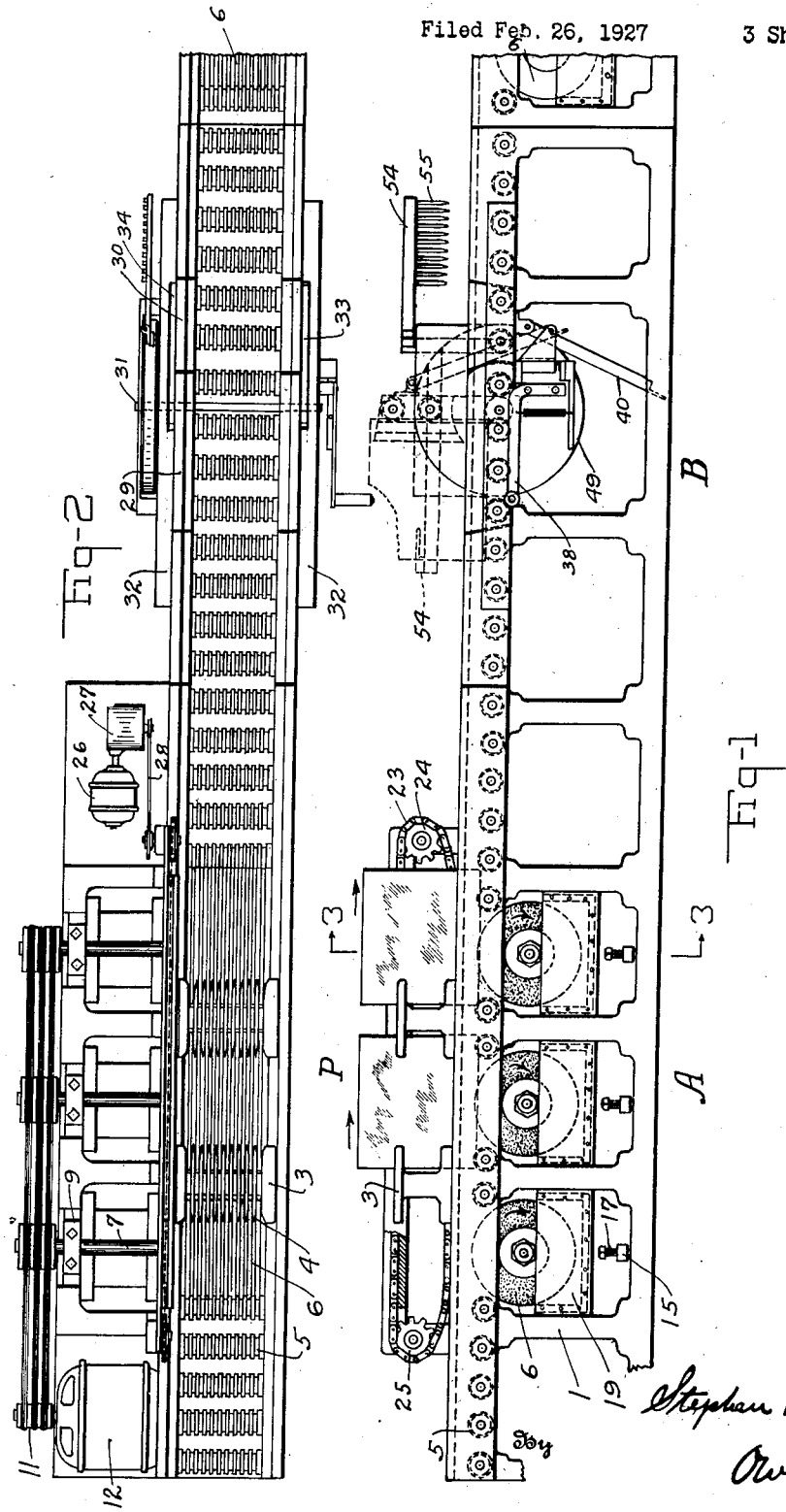
Inventor
Stephen P. Mermer
Owen & Owen
Attorneys

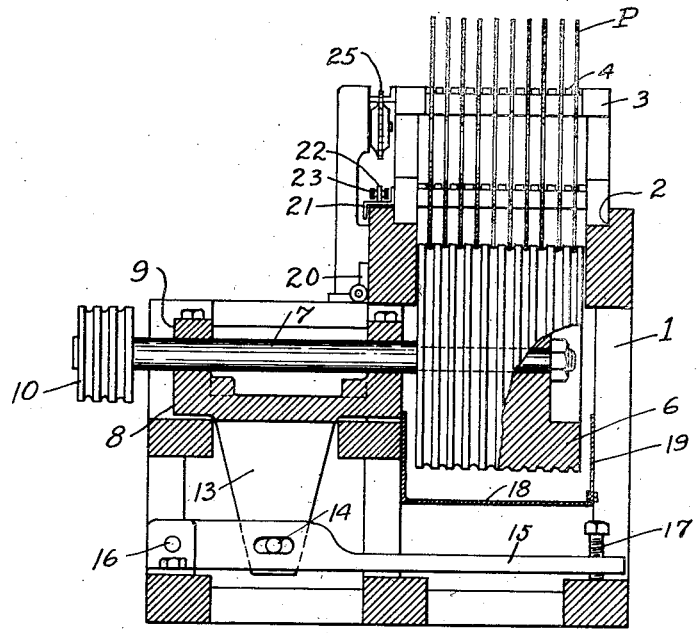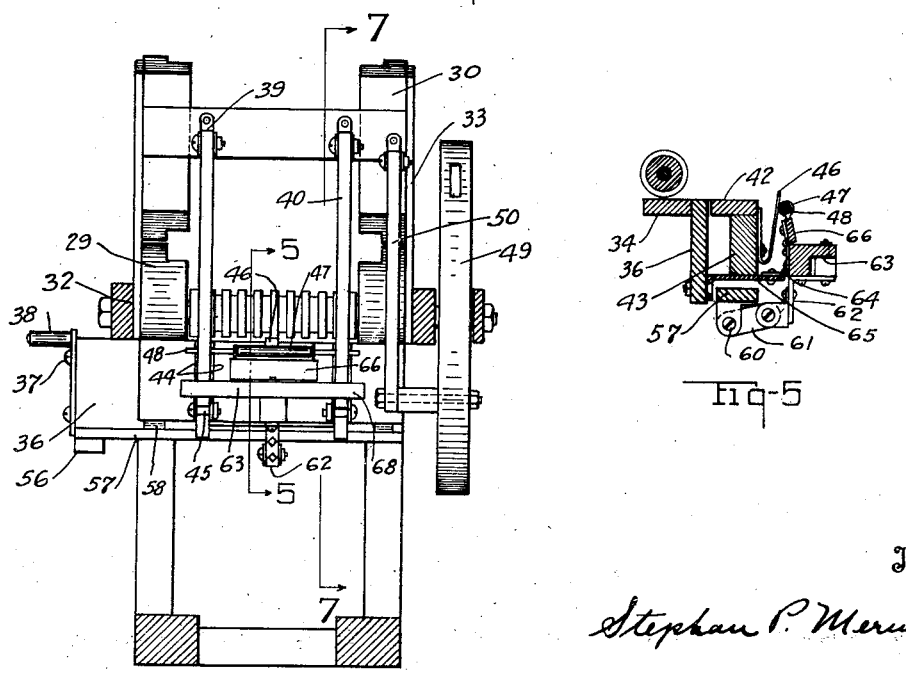

Oct. 16, 1928.

S. P. MERMER 1,687,985

GLASS GRINDING MACHINE

Filed Feb. 26, 1927    3 Sheets-Sheet 3

Patented Oct. 16, 1928.

1,687,985

UNITED STATES PATENT OFFICE.

STEPHAN P. MERMER, OF TOLEDO, OHIO.

GLASS-GRINDING MACHINE.

Application filed February 26, 1927. Serial No. 171,145.

This invention relates to grinding machines, but more particularly to a machine for grinding or beveling the edges of glass plates used for automobile wind shields, windows, table tops, show cases and the like.

There are at present in use, machines for grinding edges of glass plates which comprise a line of support on which glass plates are moved, and during such movement grinding wheels operate to grind or bevel an edge of these plates. After an edge of each plate has been ground, it has heretofore been necessary for two or more men to handle these large plates, and turn them over so that another edge may be ground. While such machines operate satisfactorily, the handling of the glass plates is exceedingly troublesome, and expensive, and is quite inefficient when a large number of plates are being worked upon each day.

An object of this invention is to provide in a machine for grinding edges of glass plates, mechanism for turning a plate after it has been ground on one edge to another edge so that another edge is properly positioned for grinding.

Another object of the invention is to provide a machine for grinding the edges of glass plates having the new and improved features of construction and arrangement hereinafter described.

Figure 6:
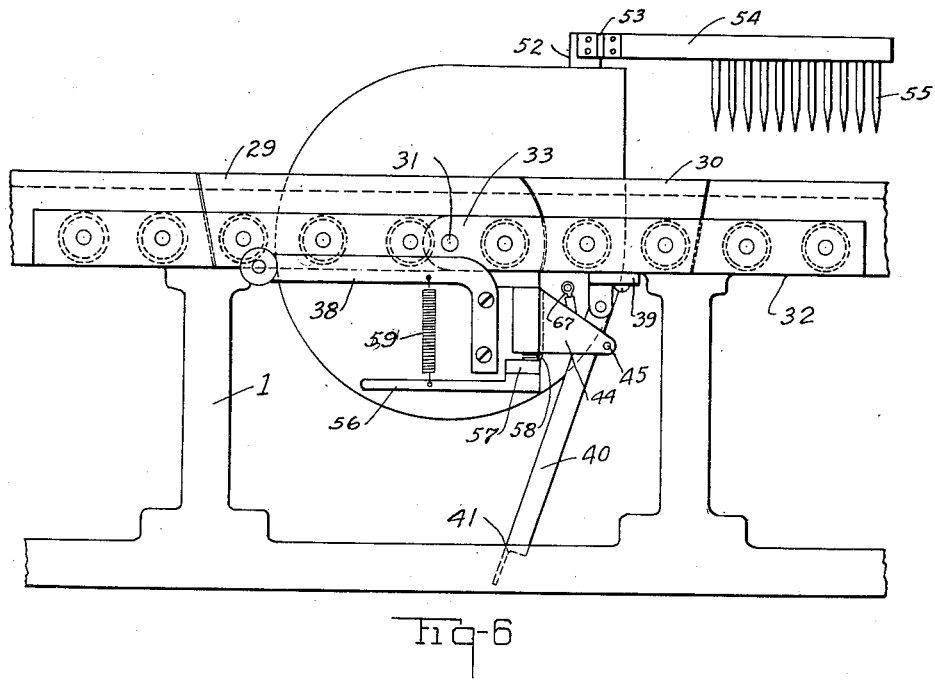
Figure 7:
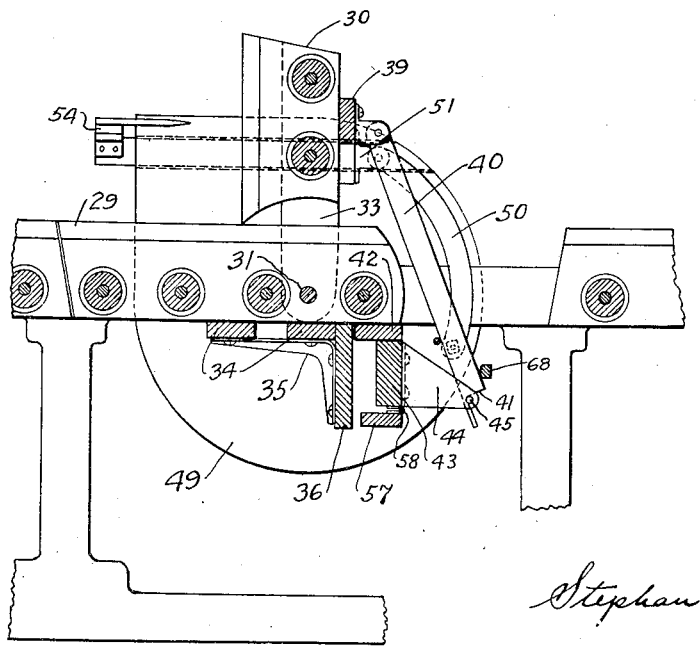

For illustrative purposes the invention is shown on the accompanying drawings, in which:

Fig. 1 is a side elevational view of a glass grinding machine; Fig. 2 is a top plan view of the machine shown in Fig. 1; Fig. 3 is a transverse sectional elevation on the line 3—3 of Fig. 1 showing the manner of adjusting the grinding wheels; Fig. 4 is a transverse section showing a track section elevated to receive the plates; Fig. 5 is a section on the line 5—5 of Fig. 4; Fig. 6 is an enlarged elevation of the plate turning mechanism; and Fig. 7 is a section on the line 7—7 of Fig. 4.

The illustrated embodiment of the invention comprises a machine for grinding the edges of glass plates, and consists of mechanism A for grinding an edge of a number of glass plates while the latter are being moved horizontally along a support, and mechanism B for turning a number of plates over on their forward edges so that these edges may be subsequently ground. While I have not indicated additional mechanism on the drawings for grinding other edges of the plates, it is to be understood that the mechanism herein shown may be duplicated as desired, so that successively the edges of a glass plate or glass plates may be ground without removing the plates from their common support. Although the grinding mechanism which I have shown, may be employed for grinding other edges of the glass plates after the latter have been turned to present another edge for grinding, those persons skilled in this art will readily understand and appreciate that mechanisms other than are shown on the drawings may be utilized for this purpose.

The grinding and advancing mechanism for the glass plates designated by the reference character A, comprises a support 1 which is also common to the mechanism B, and which need not be described in detail, as the construction thereof forms no part of the present invention other than features hereinafter described. The upper part of the support 1 consists of spaced rails having horizontally disposed grooves 2, in which racks 3 are slidable. The racks 3 are provided with fingers 4 spaced transversely of the support 1 to receive glass plates P therebetween, and guidingly maintain such plates on edge in a substantially vertical position. It will be observed that fingers 4 extend in opposite directions from the center part of the rack to receive glass plates on opposite sides thereof.

The glass plates P are advanced horizontally over the support 1, and during this movement pass over grooved rollers 5 rotatably mounted in the support 1. Arranged in the line of travel of the glass plates P and upon which the plates are supported at intervals of travel, are grinding wheels 6 having grooved peripheries, the plates being guided over the grooves in the grinding wheel, as will be apparent. As shown in the drawing, three grinding wheels are employed, but this number may be increased or diminished according to the demands of service and the nature of the edge to be ground.

Each grinding wheel 6 is rotatable with a transversely disposed shaft 7, and is mounted on one end thereof. The shaft 7 is supported at two points by a bearing member 8 having caps 9 bolted to the bearing member 8 for holding the shaft in position. The bearing member 8 is vertically slidable in the support 1, a recess in the support being provided for this purpose. At the opposite end of the shaft 7 is a pulley 10. As shown in Fig. 2 the several pulleys 10 are connected by cables to a pulley 11 of an electric motor 12. The electric motor 12 rotates the grinding wheel 6 in the direction of feed of the glass plates P.

In order vertically to adjust each grinding wheel 6 in order to compensate for wear and for other purposes, a bracket 13 depends from the bearing member 8, and is pivoted at 14 to an intermediate point on a lever 15. The lever 15 is pivoted at one end by a pin 16 to the support 1, and a vertically disposed adjusting screw 17 at the opposite end of the lever 15 enables the grinding wheel 6 to be raised or lowered, as desired.

The lower portion of each grinding wheel 6 operates in a pan 18 having a removable plate 19 to receive suitable liquid, as is customary in the use of wheels of this character. The door 19 may be removed so that the inside of the pan may be thoroughly cleaned.

In order to enable the grinding wheels to be thoroughly inspected and so that they may be removed from the respective shafts 7 for replacement or other purposes, the rails having the grooved track 2 for a portion of its length, are connected by hinges 20 to one side of the support. By removing the racks 3 from the track, it will be apparent that the rails may be swung on their hinges to one side and entirely uncover the grinding wheels. This gives free and unrestricted access to the grinding wheels.

For moving the racks 3, which guidingly maintain the glass plates on edge along the line of support, each rack is provided with a substantially Z-shaped member 21, which is fixed to a lower portion of the rack and fits over the adjacent track rail and extending vertically from the member 21 is a pin 22, which is engageable in a link of a chain 23. The chain 23 is trained about sprockets 24 and 25 arranged in horizontally spaced relation along a part of the track. The sprocket 24 is driven by an electric motor 26 through reduction gearing 27 and a chain and sprocket connection 28.

With each rack 3 in engagement with a link of the chain 23, the glass plates P are conjointly advanced along the line of support and over the grinding wheel 6, and during such movements the lower edge of each plate is ground in the manner desired. As heretofore mentioned the number of grinding wheels may be varied, and the form of wheels chosen in accordance with the form of edge desired on the plates.

Subsequent to the grinding operation heretofore described, the glass plates are manually delivered to the mechanism B where a number of plates are con omitantly turned on their forward edges so that these edges are then in position to be ground.

For this purpose a section 29 of the track and another section 30 of the track, are movable relatively to the remainder of the track and support. The section 29 is normally supported at one end by uprights of the frame 1, and is pivoted at its opposite end portion to a shaft 31, which is supported at its opposite ends in bars 32 which extend across and join the separated portions of the main frame. The section 30 is provided at opposite sides with bars 33 which are pivotally connected at their outer ends to the transverse shaft 31. The section 29 first receives the glass plates from the above described grinding mechanism, and is somewhat longer than the section 30. Each section is movable relatively to the other about the shaft 31.

Fixed to and extending transversely across the underside of the track section 29, are bracing strips 34 to which one arm of an angle brace 35 is secured by screws. The other arm of the brace 35 is connected to a vertically depending panel 36, it being understood that two or more braces 35 are employed to enhance the strength of the structure. Secured by screws 37 to an outer end of the panel 36 is an operating handle or arm 38. By swinging the arm 38 in a clockwise direction (Fig. 6), the track section 29 is correspondingly moved about the shaft 31.

Mechanism is provided to enable the track sections 29 and 30 to be connected when arranged at a substantially 90° angle, such connection permitting conjoint movement as will later appear. Attached to the underside of the track section 30, are brackets 39 to which are pivoted catch arms 40 having notched outer ends 41.

Secured to the underside of the track section 29 is a reenforcing or bracing strip 42 from which depends a panel 43 securely fixed thereto. Rigid with the panel 43 and extending outwardly therefrom at opposite sides are two pairs of guide plates 44, between each pair a catch arm or bar 40 being guided. The outer end portions of each set of plates is connected by a pin 45 engageable by the notched end of a respective catch arm 40.

It is manifest by moving the track section in a counter clockwise direction as previously mentioned, the pins 45 of the guide plates 44 move along the catch bars 40 until the notched ends 41 engage the pins. Thereafter the operating arm 38 may be moved to rock both sections together, one section being at substantially right angles to the other.

When the parts are in this position a set of glass plates may be manually moved along the track and into engagement with the section 30, which serves as an abutment. Subsequently, the handle 38 is turned in a clockwise direction (Fig. 7) to swing simultaneously the section 29 upwardly, and the section 30 downwardly about the transverse shaft 31. In this manner the several glass plates are turned through an angle of 90 degrees with the forward edge downwardly.

The notched ends 41 of the arms 40 are held into engagement with the pins 45 by a spring 46 which is connected to the bar 43 and bears against a roller 47. The roller 47 is free to rotate on a stem 48 which projects beyond opposite ends of the roller and bears against the catch arms 40 to hold the latter in engagement with the pins 45. By this means the notched ends of the catch arms are snapped into engagement with the pins 45 and held against accidental disengagement therefrom, thereby enabling the track sections to be concomitantly rocked to turn the glass plates on their forward edges.

During this movement it is desirable that the glass plates be held in separated or spaced relation, and for this purpose a disk 49 is pivoted on the shaft 31, and is connected by means of a bowed link 50 to a bracket 51 depending from the section 30. Slidably connected to the disc 49 is a bar 52 to the outer end of which is connected by a hinge 53, an arm 54 having spaced teeth 55. It will be seen that the disc 49 rotates about the shaft 31, and moves conjointly with the section 30. When the section 30 is moved to a position at substantially right angles to the section 29, the arm 54 may be swung outwardly to a position substantially parallel with the section 29, and the glass plates may be arranged between the teeth 55.

After the glass plates have been moved against the section 30 and held in spaced relation by the teeth 55, the operating lever 38 is turned in a clockwise direction, (Fig. 7) to turn the plates on their forward edge or the edge in engagement with the section 30. After the plates have been turned over the section 29 may be released to enable the sections 29 and 30 to assume their normal position.

The mechanism for disengaging the notched ends of the catch arms 40 from the pins 45 comprises a release arm 56 fixed at one end to a transverse bar 57 connected to the underside of the panel 43 by hinges 58. A coiled spring 59 connects the operating handle 38 and arm 56 to hold the arm in proper position. Fixed to the underside of the bar 57 midway of its length is a bracket 60 to which is pivoted a link 61. The opposite end of the link 61 is pivoted to a bracket 62 secured to the underside of a transverse bar 63 which is connected by a hinge 64 to a plate 65. The plate 65 is secured to the transversely extending panel 36. A bar 66 is hinged to the bar 63 and fixed to the bar 66 are apertured brackets or guides 67 which loosely fit over the rod or stem 48.

Integral with the bar 63 are extensions 68 which project beyond the ends of the bar 63 and engage the outer sides of the catch arms 40. When it is desired to disengage the notched ends of the arm 40 from the pins 45, the arm 56 is depressed or moved in a counter clockwise direction (Fig. 6) and through the connections above described, the extensions 68 positively move the arms 40 inwardly away from the pins 45, and at the same time depressing the spring 46 to permit the track sections 29 and 30 to resume their horizontal positions.

The above described mechanism operates satisfactorily for the purpose, but it will be understood that this description is given by way of illustration and not of limitation. In its broadest aspect the invention consists of mechanism for handling one or more plates in a simple and convenient manner in order to position another edge for grinding, thereby eliminating the services of two or three men and reducing the cost of production.

A portion of grinding mechanism for grinding another edge of the plates is shown at the right of Figs. 1 and 2. This mechanism may operate in a manner similar to that hereinbefore described, and further description is deemed unnecessary.

Although the embodiment of the invention has been shown and described in connection with glass plates, it is to be understood that the invention is not limited solely to plates of glass, because it is equally advantageous in connection with plates other than glass.

While I have described my improved machine in more or less detail to comply with the requirements of the statute, it is nevertheless desired that this detailed description be considered merely as illustrative and not as limiting, and it is to be understood that changes and modifications may be made by those skilled in this art without departing from the invention as defined in the appended claims.

What I claim as new and desire to secure by Letters Patent is:

1. A machine for grinding edges of glass plates comprising a line of support upon which the glass may be stood on edge in substantially vertical position, means for guidingly maintaining said plate in such position, grinding means rotated substantially on the level with said line of support and onto which the glass plate moves so that the edge thereof may be ground, and means for turning the glass in order that another edge thereof may be ground.

2. A machine for grinding edges of glass plates comprising supporting means, means for moving a glass plate over said supporting means with the plate standing on edge in substantially a vertical position, means for grinding the lower edge of said plate, and mechanism operable subsequently to said grinding operation to turn said glass plate so that another edge thereof may be ground.

3. In a machine for grinding edges of glass plates, a track, means for moving a glass plate over said track with the plate standing on edge in a substantially vertical position, means for grinding the lower edge of said plate while the latter is traveling, and means in advance of said grinding means for swinging a portion of said track with a glass plate thereon at substantially right angles to the remainder of the track to turn the said glass plate on its forward edge and thereby to position said forward edge for grinding.

4. In a machine for grinding edges of glass plates, horizontally disposed supporting means, means for moving glass plates along said supporting means with the plate disposed on edge in a substantially vertical position, means for grinding the lower edge of the plate, and means in advance of said grinding means for turning said plate relatively to said supporting means so that another edge of said plate may be ground.

5. In a machine for grinding edges of glass plates, a line of support upon which a glass plate may be supported on edge in a substantially vertical position, means for moving said plate over said line of support, means for grinding the lower edge of said plate during the movement thereof and mechanism in advance of said grinding means for causing said plate to be turned upon another edge so that another edge of the plate may be ground without removing the plate from the support.

6. In a machine for grinding the edges of glass plates, a horizontal track, means for guidingly maintaining a glass plate on said track in a substantially vertical position, means for grinding the bottom edge of the glass plate during its travel, an abutment against which the plate is movable, and means for swinging a portion of the track conjointly with the abutment for turning the plate over on another edge so that the the latter edge may be subsequently ground.

7. In a machine for grinding edges of glass plates, a horizontally disposed line of support, having a movable portion, means for guidingly maintaining a glass plate on edge in a substantially vertical position on said support, means for moving said plate along said support, means to grind the lower edge thereof while traveling and means for moving said portion of said support in such a manner to turn the glass plate to another edge so that said last edge may be properly positioned for grinding.

8. In a grinding machine, a frame, spaced rails on the frame having grooves extending through their tops and inner sides, grooved rollers for supporting the material to be ground carried by the frame and extending transversely across the space between the rails, a grinding wheel also extending transversely across the space between the rails and disposed between certain of the rollers, and material holding racks engaged in the grooves of the rails for carrying the glass past the grinding wheels to thereby grind the same.

9. In a machine for grinding the edges of plates, means for grinding an edge of the plate, means spaced from the grinding means to turn the plate subsequent to grinding of said edge so as to present another edge of the plate to the grinding edge, means for supporting the plate during grinding thereof, and means for mounting the supporting means for movement from the grinding means into engagement with the turning means.

10. In a machine for grinding the edges of plates, means for grinding an edge of the plate, means spaced from the grinding means to turn the plate subsequent to grinding of said edge so as to present another edge of the plate to the grinding edge, means for supporting the plate during grinding thereof, means for mounting the supporting means for movement from the grinding means into engagement with the turning means, means to hold the plate on the turning means during turning thereof, and means to mount the holding means for movement into and out of operative position.

11. In a plate grinding machine, a track, a plate carrier, grinding means, said track having a pair of portions, means to mount said portions for independent movement so that one is movable to lie at substantially right angles to the other and for simultaneous movement of both in said right angular relation whereby to turn the plate by engagement of adjacent edges thereof with said portions, and means to hold said portions in their said right angular relation.

12. In a plate grinding machine, a track, a plate carrier, grinding means, said track having a pair of portions, means to mount said portions for independent movement so that one is movable to lie at substantially right angles to the other and for simultaneous movement of both in said right angular relation whereby to turn the plate by engagement of adjacent edges thereof with said portions, means to hold said portions in their said right angular relation, means to hold the plate on the turning means during operation of the latter, and means to mount the holding means for movement into and out of engagement with the plate.

13. In a plate grinding machine, a track, a plate carrier, grinding means, said track having a pair of movable portions one of which is movable to lie at right angles to the other, automatic means to latch said parts in their said right angular relation, means to effect simultaneous movement of said parts in said right angular relation thereof so as to turn the plate, and means to operate the latching means to release same.

In testimony whereof I have hereunto signed my name to this specification.

STEPHAN P. MERMER.